United States Patent
Brown et al.

(10) Patent No.: US 10,349,402 B2
(45) Date of Patent: Jul. 9, 2019

(54) TRANSMISSION CONTROL METHOD INTENDED FOR BEING IMPLEMENTED BY A STATION IN A TELECOMMUNICATIONS NETWORK

(71) Applicant: Orange, Paris (FR)

(72) Inventors: Patrick Brown, Cagnes sur Mer (FR); Jérôme Galtier, Nice (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/323,036

(22) PCT Filed: Jun. 24, 2015

(86) PCT No.: PCT/FR2015/051704
§ 371 (c)(1),
(2) Date: Dec. 29, 2016

(87) PCT Pub. No.: WO2016/001531
PCT Pub. Date: Jan. 7, 2016

(65) Prior Publication Data
US 2018/0176908 A1    Jun. 21, 2018

(30) Foreign Application Priority Data
Jun. 30, 2014   (FR) ...................................... 14 56217

(51) Int. Cl.
*H04W 72/04*    (2009.01)
*H04W 74/08*    (2009.01)
(Continued)

(52) U.S. Cl.
CPC ....... *H04W 72/0446* (2013.01); *H04W 74/08* (2013.01); *H04L 12/413* (2013.01);
(Continued)

(58) Field of Classification Search
CPC . H04W 84/12; H04W 72/0446; H04W 74/00; H04W 74/02; H04W 74/08;
(Continued)

(56) References Cited

U.S. PATENT DOCUMENTS 6,181,687 B1 *   1/2001   Bisdikian ............ H04L 12/2801
                                              370/319
2006/0193274 A1*   8/2006   Yamagata ........... H04W 74/085
                                              370/310
(Continued)

FOREIGN PATENT DOCUMENTS

FR          2 893 206           5/2007
WO     WO 2012/001285 A1        1/2012
(Continued)

OTHER PUBLICATIONS

Chatschik, IBM, WO99/22495, A System and a Method for Continuously Adjustable, Splitting Group, Multi-Contention Resolution in Multi-Access Computer Communication Systems, IBM.*
(Continued)

*Primary Examiner* — Warner Wong
(74) *Attorney, Agent, or Firm* — Knobbe, Martens, Olson & Bear, LLP (57) ABSTRACT

One embodiment relates to a transmission regulation method is for implementation by a station having at least one frame for transmission via a telecommunications network, the station belonging to a first group of stations sharing the same contention resolution mechanism. The method comprises participating in a tournament serving to decide, within the first group, between stations entitled to transmit at the end of the tournament and stations not entitled to transmit, and when the station is entitled to transmit, the method comprises transmitting the frame in a time period during which stations of a second group performing another contention
(Continued)

resolution mechanism are not entitled to transmit in the network.

14 Claims, 8 Drawing Sheets

(51) Int. Cl.
| | |
|---|---|
| H04W 74/02 | (2009.01) |
| H04L 12/70 | (2013.01) |
| H04L 12/413 | (2006.01) |
| H04L 27/34 | (2006.01) |
| H04W 84/12 | (2009.01) |

(52) U.S. Cl.
CPC .......... *H04L 27/3488* (2013.01); *H04L 47/00* (2013.01); *H04W 74/02* (2013.01); *H04W 84/12* (2013.01)

(58) Field of Classification Search
CPC .... H04W 74/0833; H04L 47/00; H04L 47/70; H04L 27/183; H04L 27/2604; H04L 27/3488; H04L 12/413
See application file for complete search history.

(56) References Cited

U.S. PATENT DOCUMENTS

| | | | | |
|---|---|---|---|---|
| 2007/0287456 | A1* | 12/2007 | Shimizu | H04W 52/0251 455/435.1 |
| 2008/0151814 | A1* | 6/2008 | Jokela | H04W 74/006 370/328 |
| 2011/0305216 | A1* | 12/2011 | Seok | H04W 74/006 370/329 |
| 2013/0070627 | A1* | 3/2013 | Chen | H04W 74/08 370/252 |
| 2016/0330754 | A1* | 11/2016 | Martin | H04W 72/12 |

FOREIGN PATENT DOCUMENTS

| | | |
|---|---|---|
| WO | WO 2012/059674 A2 | 5/2012 |
| WO | WO 2013/049826 A1 | 4/2013 |

OTHER PUBLICATIONS

Abichar et al. 2005. CONTI: Constant-Time Contention Resolution for WLAN access. In R. Boutaba et al. (Eds.), *Networking 2005, LNCS.* vol. 3462, pp. 358-369. International Federation for Information Processing.

Zhao et al. 2012. Enhanced QoS 802.11n Prototype Including a Tournament Contention Function. *2012 IEEE Wireless Communications and Networking Conference: MAC and Cross-Layer Design,* pp. 1512-1517.

International Search Report dated Sep. 17, 2015 for International Application No. PCT/FR2015/051704 filed Jun. 24, 2015, 7 pages.

Written Opinion dated Sep. 17, 2015 for International Application No. PCT/FR2015/051704 filed Jun. 24, 2015, 6 pages.

Galtier J. et al., "Analysis and Optimizatioon of MAC with Constant Size Congestion Window for WLAN", Proceedings of the 3$^{rd}$ International Conference on Services and Networks Communications, INRIA, Library of Congress No. 2007930108; Aug. 2007, 6 pages.

ISO/IEC Standard for Information Technology—Telecommunications and Information Exchange Between Systems—Local and Metropolitan Area Networks—Specific Reqirements Part 11: E 802.11A-1999 (90 pages), IEEE 802. 11B-1999 (96 pages), IEEE 802. 11D-2001 (34 pages), Wireless medium 15 access control (MAC) and physical layer (PHY) specifications.

International Preliminary Report on Patentability dated Jan. 3, 2017 for Application No. PCT/FR2015/051704, filed Jun. 24, 2015.

* cited by examiner

TRANSMISSION CONTROL METHOD INTENDED FOR BEING IMPLEMENTED BY A STATION IN A TELECOMMUNICATIONS NETWORK

RELATED APPLICATIONS

This application is the U.S. National Phase of Application No. PCT/FR2015/051704 entitled "TRANSMISSION CONTROL METHOD INTENDED FOR BEING IMPLEMENTED BY A STATION IN A TELECOMMUNICATIONS NETWORK" filed Jun. 24, 2015, which designated the United States, and which claims the benefit of French Application No. 1456217 filed Jun. 30, 2014.

BACKGROUND OF THE Invention

The invention relates to the field of wireless telecommunications networks, and in particular to wireless local networks complying with the IEEE 802.11 family of standards.

Such networks are also known as WiFi networks. In numerous applications, they are used to network together various stations, e.g. computers, personal assistants, and peripherals.

In the document "IEEE 802.11a-1999, IEEE 802.11b-1999, IEEE 802.11d-2001, part 11: wireless medium access control (MAC) and physical layer (PHY) specifications", the 802.11 standard defines a method of regulating traffic in the wireless network. That method makes use of a system of congestion windows (CW) for regulating the traffic. According to that standard, and in general manner, a station draws a random number cw in the range 0 to CW−1, the value CW being an integer lying between two values CWmin and CWmax defined by the 802.11 standard, e.g. 16 and 1024. This value cw is used as a backoff timer for transmitting a packet, with counting being deferred if the station observes that another station is transmitting.

Figure 1:
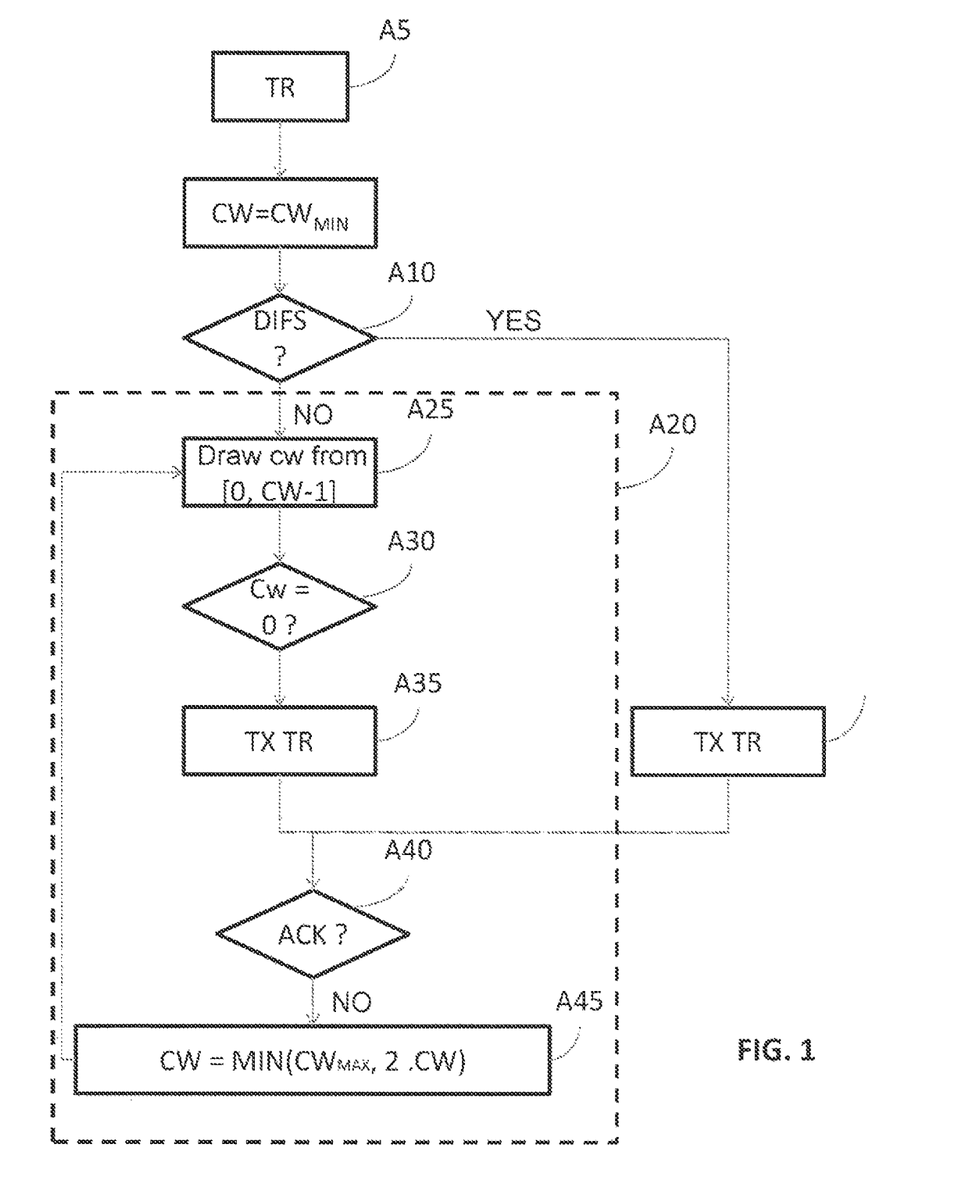
FIGS. 1 and 2, described above, show a transmission regulation method in compliance with the 802.11 standard.

The main steps of that conventional method are described below with reference to FIGS. 1 and 2.

When a frame TR is ready for transmission (step A5), the station determines (step A10) whether the medium has been free for a duration of at least DIPS.

If so, the frame is transmitted (step A15).

Otherwise, and in particular if the station itself was transmitting a frame, the station starts (step A20) a contention period after a silence of duration DIPS since the last transmission.

The contention period consists in waiting (step A30) for the above-mentioned backoff timer cw drawn at random in the range 0 to CW−1 (step S25) before transmitting the frame TR (step A35). On each attempt at transmission that is unsuccessful, i.e. when the transmitted frame is not acknowledge (test A40), a new congestion window CW is calculated on the basis of the current value of CW (step A35) and using the formula CW'=Min(CWmax, 2.CW), and a new backoff timer is drawn at. random in the range 0 to the new value CW'−1 (step A40) .

Figure 2:
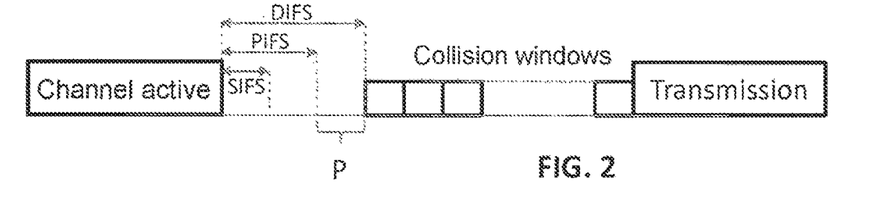

As shown in FIG. 2, contention is suspended for a total period including both a period of the medium being active with a frame being transmitted, and also a period DIFS (DCF interframe space) that is long enough to leave the receiving station time to acknowledge the received frame after SIFS (short interframe space) and to allow an access point to transmit a management message after PIFS (PCF interframe space). The stations performing that mechanism do not transmit during the range [PIFS, DIFS] that is referenced P in this figure.

Unfortunately, that conventional mechanism with congestion windows generates a large number of collisions, which means that the user suffers a considerable loss of bandwidth.

Several contention resolution methods have been proposed in the state of the art.

One method is known as the "tournament" method and is described in the document by Z. Abichar and M. Chang "CONTI: Constant time contention resolution for WLAN access" IFI Networking 2005, referred to below as [CONTI]; it proposes a constant time method of resolving contention that makes use of a series of successive tests for selecting the station that is to transmit, for regulating the transmissions of frames, and for limiting the collision rate.

In general manner, the tournament method consists in organizing a kind of tournament between stations having at least one frame for transmission. A tournament is made up of a certain number of selection rounds, each executed during a time interval of predefined duration. At the beginning of the tournament, all of the stations having a frame for transmission could be entitled to transmit the frame. On each selection round, one or more stations might be deleted from the list of stations entitled to transmit depending on whether they are allocated an entitlement to transmit or a prohibition to transmit during the selection rounds. At the end of the tournament, only those stations that have not been eliminated are entitled to transmit. If a plurality of stations are still in the running at the end of the tournament, they transmit simultaneously, thereby giving rise to a collision, and thus to disturbed reception with it being impossible to receive the transmitted data frame correctly. These stations must then participate in the following tournament in a new attempt to transmit the frame.

More precisely, in the CONTI method, the elimination of stations seeking to transmit is accomplished by using a Boolean variable referred to as a "try-bit". More precisely, each station selects this variable randomly and transmits a signal over the network if this value is equal to 1, and otherwise listens to the network. A station withdraws from the network, i.e. decides not to transmit its data packet during a series of selection rounds, if the binary value is 0 and if it detects a signal being transmitted by another station.

Although providing better performance than the congestion method defined in the 802.11 standard, the contention resolution method proposed by CONTI still generates a large number of collisions in accessing the wireless network. This drawback is due to the fact that the probability relationship used for drawing the random "try-bit" variable is not optimized.

Document FR 2 893 206 in the name of the Applicant describes another tournament method that makes it possible to reduce considerably the number of collisions experienced by CONTI, by improving the probability relationship used for drawing the try-bit binary random value.

In general manner, the problem of coexistence between stations complying with the 802.11 protocol, referred to below as "conventional" stations, and stations using a tournament mechanism raises a problem in terms of fair access to resources.

The invention provides a method of regulating transmission that makes it possible to allow stations that perform a tournament mechanism to cohabit with conventional stations in compliance with the 802.11 protocol.

OBJECT AND SUMMARY OF THE INVENTION

Thus, in a first aspect, the invention relates to a transmission regulation method for performing by a station having at least one frame for transmitting via a telecommunications network, the station belonging to a first group of stations sharing the same contention resolution mechanism, the method including a step of participating in a tournament serving to decide, within the first group, between stations entitled to transmit at the end of the tournament and stations not entitled to transmit.

In accordance with the invention, when the station is entitled to transmit, the method includes a step of transmitting the frame in a time period during which stations of a second group performing another contention resolution mechanism are not entitled to transmit in the network.

Correspondingly, the invention relates to a regulation device for incorporating in a station having at least one frame for transmitting via a telecommunications network, the station forming part of a first group of stations sharing the same contention resolution mechanism. The device includes means for participating in a tournament that is used to decide, within the first group, between stations entitled to transmit at the end of the tournament and stations not entitled to transmit, the station including means, for use when the station is entitled to transmit, to transmit the frame in a time period during which the stations of a second group performing another contention resolution mechanism are not entitled to transmit in the network.

Thus, in general manner, the invention proposes protecting frames presented by the stations of the first group against collisions with frames transmitted by the stations of the second group by transmitting these frames in periods of time during which the stations of the second group are not entitled to transmit.

The invention thus improves coexistence between stations that access the same medium but that use contention resolution mechanisms that are different.

In a particular implementation, the time period during which the stations of the first group that have won a tournament transmit is a period lying between the durations PIFS and DIFS as defined in the IEEE 802.11 standard and measured from the end of the transmission of a frame. This implementation serves advantageously to enable stations using a tournament mechanism to coexist with stations using a conventional congestion window mechanism in compliance with the IEEE 802.11 standard, with the stations that have won a tournament transmitting frames in the time range [PIFS, DIFS] referenced P in FIG. 2, in which time range it should be recalled conventional stations do not transmit.

In a particular implementation, a station of the first group that has won the tournament waits, before transmitting a frame, for a total number of free time slots that is equivalent to the number of free time slots, written Ts below, that would have been waited by a station of the second group before transmitting a frame in said network.

This particular implementation of the invention gives access to a channel compatible with the IEEE 802.11 standard in a manner that is fair between the stations of the first group and the stations of the second group.

In a particular implementation, in order to estimate this number of free time slots to be waited, the station of the first group simulates the behavior of at least one station of the second group that has a frame for transmission. This gives rise to a number of time slots that varies and that is adapted to the real conditions of the network environment.

Optionally, in a particular implementation, a station of the first group that has i) won the tournament and ii) waited for Ts time slots as mentioned above, transmits its frame after detecting a predetermined number of consecutive empty time slots, written Ta.

This mechanism constitutes a first safeguard making it possible in particular for the stations of the first group to transmit independently of the contention resolution mechanism of the second group after a certain delay. In particular, when the stations of the second group use a conventional congestion window mechanism in compliance with the IEEE 802.11 standard, this mechanism enables the stations of the first group that have won the tournament to transmit without waiting for a frame behind which they take protection.

In a particular implementation, the method of the invention includes a step of transmitting a frame if no tournament has started for at least a predetermined period, written T1 below.

This mechanism constitutes a second safeguard making it possible to transmit a frame if no tournament starts.

In a particular implementation, the various steps of the transmission regulation method are determined by computer program instructions.

Consequently, the invention also provides a computer program on a data medium, the program being suitable for being performed by a computer, the program including instructions adapted to implement steps of the above-mentioned transmission regulation method.

The program may use any programming language, and be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may include storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF THE INVENTION

Figure 3:
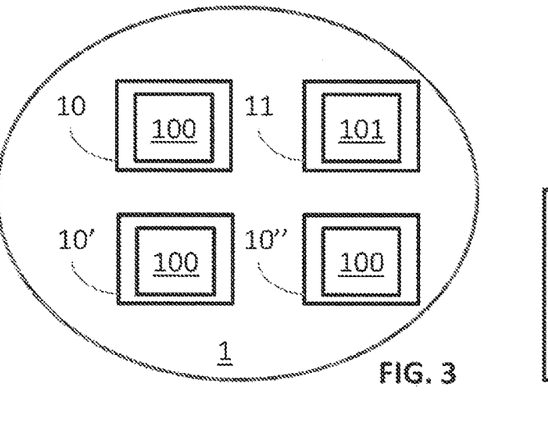
FIG. 3 represents a wireless telecommunications network.

FIG. 3 shows a wireless telecommunications network including stations 10, 10', 10" in accordance with the invention and conventional stations 11 in compliance with the 802.11 standard.

Each of the stations 10 includes a transmission regulation device 100 in accordance with the invention. In the embodiment shown in FIG. 4, the regulation device 100 comprises a processor 110, a random access memory (RAM) 120, a ROM type memory 130, and a network access module 140. These various elements are connected together by a bus system (not shown).

Figure 4:
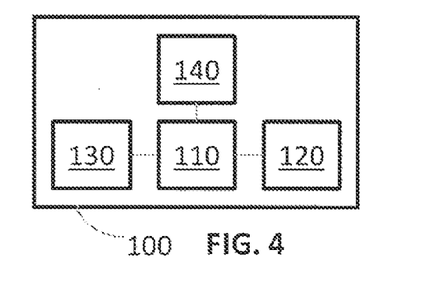
FIG. 4 represents a transmission regulation device constituting a particular embodiment of the invention.

The module 140 is suitable for transmitting and receiving frames and signals in the network 1.

In the presently-described element, the module 140 is constituted by a network access card in compliance with the IEEE 802.11 standard.

Each station 10, 10', 10" performs a method of regulating the transmission of frames in the network 1 that is based on a tournament mechanism. This regulation method may be performed by executing a computer program stored in the ROM 130.

In similar manner, each station 11 has a transmission regulation device 101 that performs a congestion window method in compliance with the IEEE 802.11 protocol as described with reference to FIGS. 1 and 2.

In the tournament method described in CONTI, transmission entitlements are allocated or not allocated to the stations by using binary random variables presenting a Bernouilli distribution. This Bernouilli distribution is defined by the probability of drawing a transmission entitlement. Such a probability is thus allocated to each station and on each selection round. The probabilities are preferably selected in such a manner that the collision rate is as low as possible, statistically speaking.

One procedure for selecting probabilities in optimum manner is described in the Document "Analysis and optimization of MAC with constant size congestion windows for WLAN" by J. Galtier, Proceedings of the Third International Conference on Services and Networks Communications, INRIA, Library of Congress Number 2007930108, August 2007.

In a particular implementation described in patent Document FR 2 893 206, the probabilities allocated to the various stations during a selection round may be a function of transmission entitlements or non-entitlements drawn during preceding selection rounds in such as manner as to minimize the collision rate.

Figure 5:
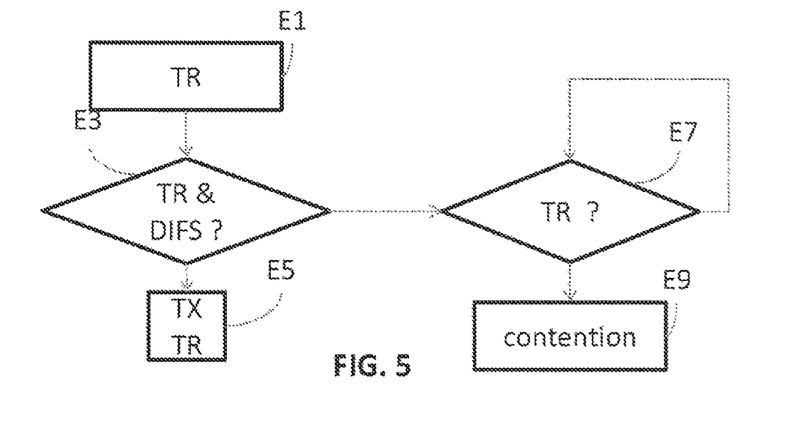
FIGS. 5 and 6 are flow charts showing a transmission regulation method in accordance with a particular implementation of the invention.
Figure 6:
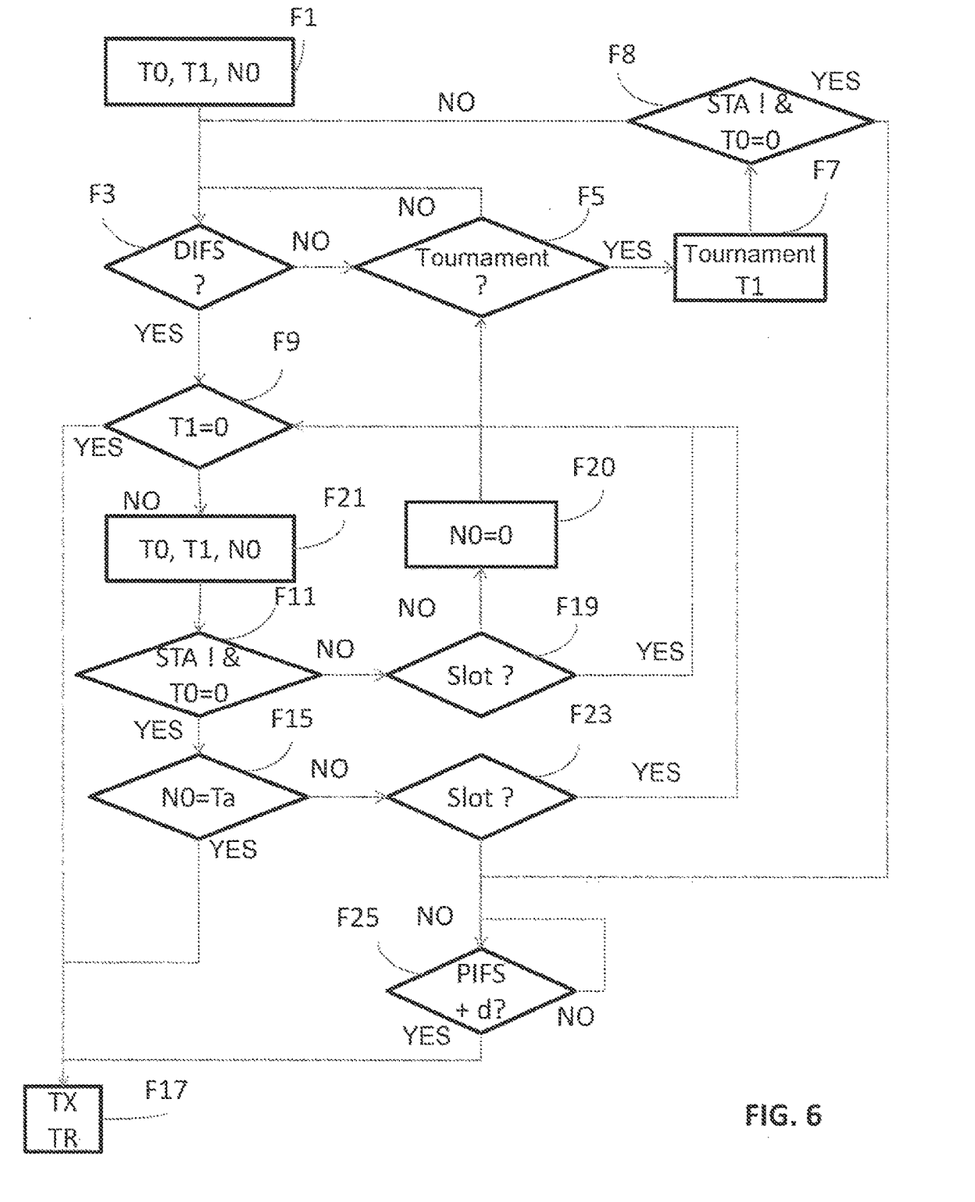

FIGS. 5 and 6 are flow charts showing the main steps of a transmission regulation method in a first implementation of the invention.

This method is performed by the transmission regulation device 100 of a station 10, 10', 10" having at least one data frame for transmitting over the network 1. All of the stations 10, 10', 10" having a data frame for transmitting perform the same method simultaneously without any need for concertation between the stations.

As described in detail below, in accordance with the invention, a station 10, 10', 10" that wins the tournament seeks to transmit its frame TR in a manner that is protected from conventional stations 11, i.e. in a time window during which the conventional stations do not transmit.

More precisely, in the presently-described implementation, a station 10, 10', 10" in accordance with the invention then transmits its frame TR after a period PIFS+d (loop F25) measured from the release of the medium following the transmission of a frame by a conventional station 11. A collision might then happen only if two stations in accordance with the invention have won the tournament, which is statistically of low probability.

In the presently-described implementation, the method of the invention seeks to avoid the stations 10, 10', 10" in accordance with the invention being given preference over conventional stations. Consequently, a station that has won the tournament waits (test F11=TRUE or test F8=TRUE) before transmitting its frame TR for a total number of free time slots equivalent to the corresponding number of time slots Ts for the waiting time of a conventional station before it transmits a frame. For this purpose, a counter T0 is used that is initialized with Ts and decremented each time a free time slot is detected (step F21).

In a particular implementation, in order to estimate this value Ts, each station. 10, 10', 10" in accordance with the invention, when it has a frame for transmission, simulates the behavior of one or more conventional stations 11 also having such a frame for transmission and performing the congestion window method as described above with reference to FIG. 1, with the exception of steps A15 and A35 of actually transmitting the frame. The stations 10, 10', 10" can thus estimate the number of time slots that each of those notional conventional stations would have waited in order to transmit its frame, and on the basis of these estimates it can calculate the value of Ts, e.g. by using a moving average or a harmonic mean.

In the presently-described implementation, if the medium is not occupied by a frame transmitted by a conventional station, the station 10, 10', 10" that has won the tournament transmits its own frame TR after a predetermined number Ta of consecutive empty time slots. For this purpose, a variable N0 is used that is incremented by unity whenever a free time slot is detected (step F21) and that is reinitialized to 0 whenever a busy time slot is detected (step F20).

In the presently-described implementation, a station STA of the invention can transmit its frame TR without any other condition providing no tournament has been started for a duration T1 (test F9) in order to avoid a blocking situation.

In the presently-described implementation, a station 10, 10', 10" that has just won a new tournament and that has already had a frame for transmission for a duration longer than the duration Ts that would have been waited by a conventional station 11 is entitled to transmit this frame in protected manner after a duration PIFS+d measured from release of the medium.

A first variant of the contention procedure described above with reference to FIG. 6 is described below with reference to FIG. 7.

It is assumed that a station 10, 10', 10" in accordance with the invention has a new frame for transmitting in step E1.

As for a conventional station 11, the station 10, 10', 10" in accordance with the invention determines (step E3) whether the new frame is the next for transmission (in other words whether it is at the front of the queue of frames for transmission) and whether the medium has been free for a duration of at least DIFS.

If so, the frame is transmitted (step E5). Otherwise, the station waits for the frame to reach the front of the queue (step E7) and in step E9 it begins a contention procedure as shown in detail in FIG. 6.

It should be recalled that in parallel, the station 10, 10', 10" in accordance with the invention simulates the behavior of at least one conventional station 11 to determine the number of time slots Ts that a conventional station 11 would wait in the current situation of the network prior to transmitting a frame successfully. During the first iteration of the method, the value Ts may for example be set at 8.

During a step F1, the station 10, 10', 10" initializes:
the variable N0 for counting the number of consecutive empty time slots to 0;
the variable T0 for encouraging fair behavior with conventional stations 11 to max (Ts−8, 0)+rand(0, 15), where rand(i,j) returns a random value of value that is uniformly distributed in the range i to j included; and
the variable T1 for enabling a frame to be sent if no tournament is started during this period to the value T0+16.

During a step F3, the station 10, 10', 10" verifies whether the medium has been free for a duration DIFS.

If not, the result of the test F3 is negative. This means that a packet is being transmitted by another station which may be conventional or in accordance with the invention.

During a step F5, the station 10, 10', 10" verifies whether a tournament has started. In the presently-described implementation, under such circumstances, the packet transmitted over the medium includes a special signal bit for this purpose.

During a step F7, the station 10, 10'10" engages in the tournament and updates the value T1 by increasing it by 16 units (T1=T1+16).

In the presently-described implementation, at the end of a step F8, the station 10, 10', 10" determines whether it has won this new tournament and whether it has had a frame for transmission for a duration longer than the duration Ts that would have been waited by a conventional station 11, in other words whether T0=0. Under such circumstances, the station waits for the medium to be released for a duration PIFS+d (loop F25) and then transmits its own frame (step F17). This transmission cannot enter into collision with a frame transmitted by a conventional station 11. If the result of the test F8 is negative, then the method returns to above-described test F3.

If, in step F3, it is found that the medium has been free for at least DIFS (positive result for the test), in a test F9, the station 10, 10', 10" verifies whether the count T1 has expired. This means that no tournament has started since T1, and the station 10 transmits its frame (step F17).

If the count T1 has not expired (negative result for the test F9), then the variables are updated during a step F21. This updating consists in decrementing T0 and T1 and in incrementing N0. More precisely, in the presently-described implementation:
T0=max(T0−1, 0), T1=max(T1−1, 0), and N0=min(N0+1, Ta)

Thereafter, during a test F11, the station 10, 10', 10" determines whether it has won the tournament and whether it has had a frame for transmission for a duration longer than the duration Ts that would have been waited by a conventional station 11, in other words T0=0. If not, the result of the test F11 is negative. During a test F19, the station, 10, 10', 10" verifies whether the time slot is free. If the medium is busy, the variable N0, which stores the number of consecutive free time slots, is reinitialized to 0 (step F20) and the method returns to step F5 in order to verify whether the frame transmitted over the medium is announcing the start of a tournament. If the medium is free (positive result from the test F19), the variables are updated during above-described step F21, unless T1 has expired, in which ease the frame is transmitted (step F17).

During a test F11, if the station 10, 10', 10" determines that it has won the tournament and that it has had a frame for transmission for a duration longer than the duration Ts that would have been waited by a conventional station 11, in other words if T0=0, then the result of the test F11 is positive. During a test F15, the station 10, 10', 10" verifies whether at least Ta consecutive free time slots have been observed, in other words whether N0=Ta.

If so, the. station 10, 10', 10" transmits its frame (step F17).

Otherwise, the result of the test F15 is negative and the station 10, 10', 10" verifies whether the medium is busy (test F'23). If the time slot is free, the variables T0, T1, N0 are updated during above-described step F21, unless T1 has expired, in which case the frame is transmitted (step F17).

If the time slot is busy (negative result for test F23), the station 10, 10', 10" waits for the medium to be free for a duration PIFS+d (loop F25) and then it transmits its frame (step F17). This transmission cannot enter into collision with a frame transmitted by a conventional station 11.

Figure 7:
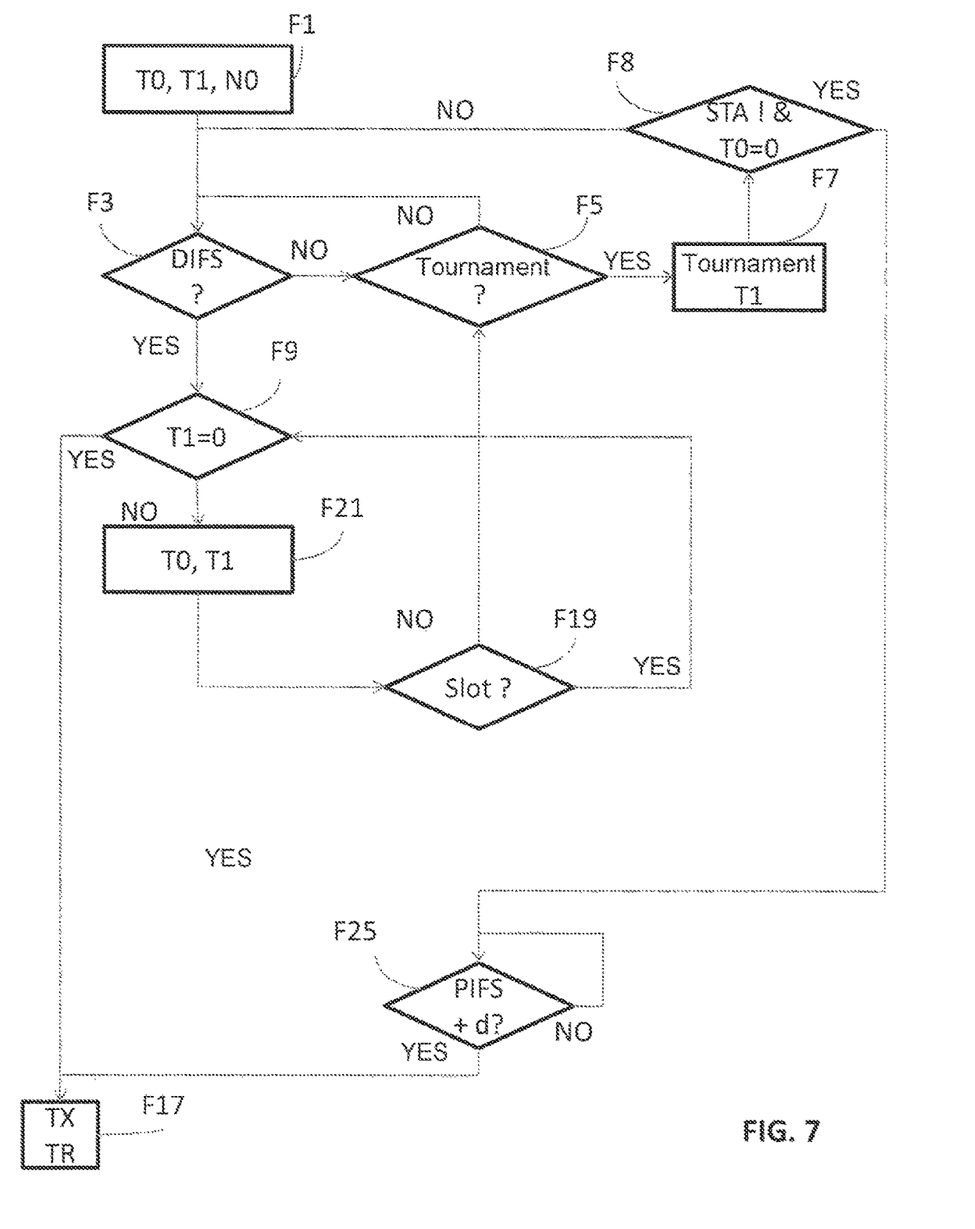
FIGS. 7, 8, and 9 are flow charts showing three variants of contention procedures that can be used in particular implementations of the invention.

With reference to FIG. 7, there follows a description of another contention procedure in accordance with the invention.

This implementation is similar to that described in FIG. 6, taking the value Ta as being infinite, which, from an implementation point of view, amounts to no longer making any use of the variable N0.

Test F15 of FIG. 6 is thus eliminated since its result would always be negative.

In this implementation, if it is found in step F3 that the medium has been free for at least DTFS (positive result from the test), during a test F9 the station 10, 10', 10" verifies whether the count T1 has expired. This means that no tournament has been started for a duration T1, and the station 10 transmits its frame (step F17).

If the count T1 has not expired (negative result from the test F9), then the variables T0 and T1 are updated during a step F21.

During the test F19, the station 10, 10', 10" then determines directly whether the medium is busy. If the medium is busy, the station verifies (step F5) whether a new tournament has been announced as in the example of FIG. 6. If the medium is free (positive result from test F19), the variables are updated during the above-described test F21, unless T1 has expired, in which case the frame is transmitted (step F17).

This implementation is thus simplified compared with the implementation of FIG. 6.

Figure 8:
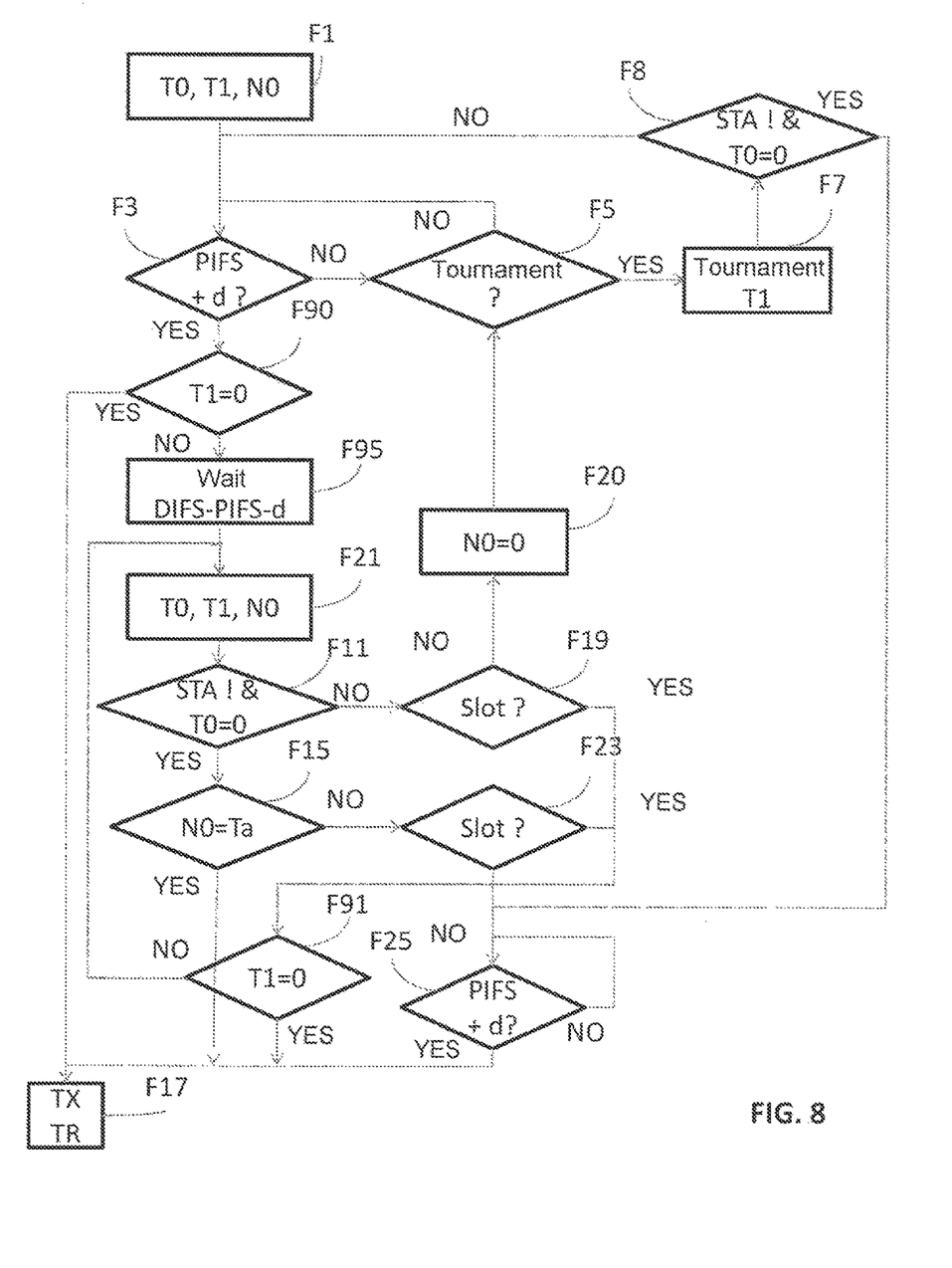
Figure 9:
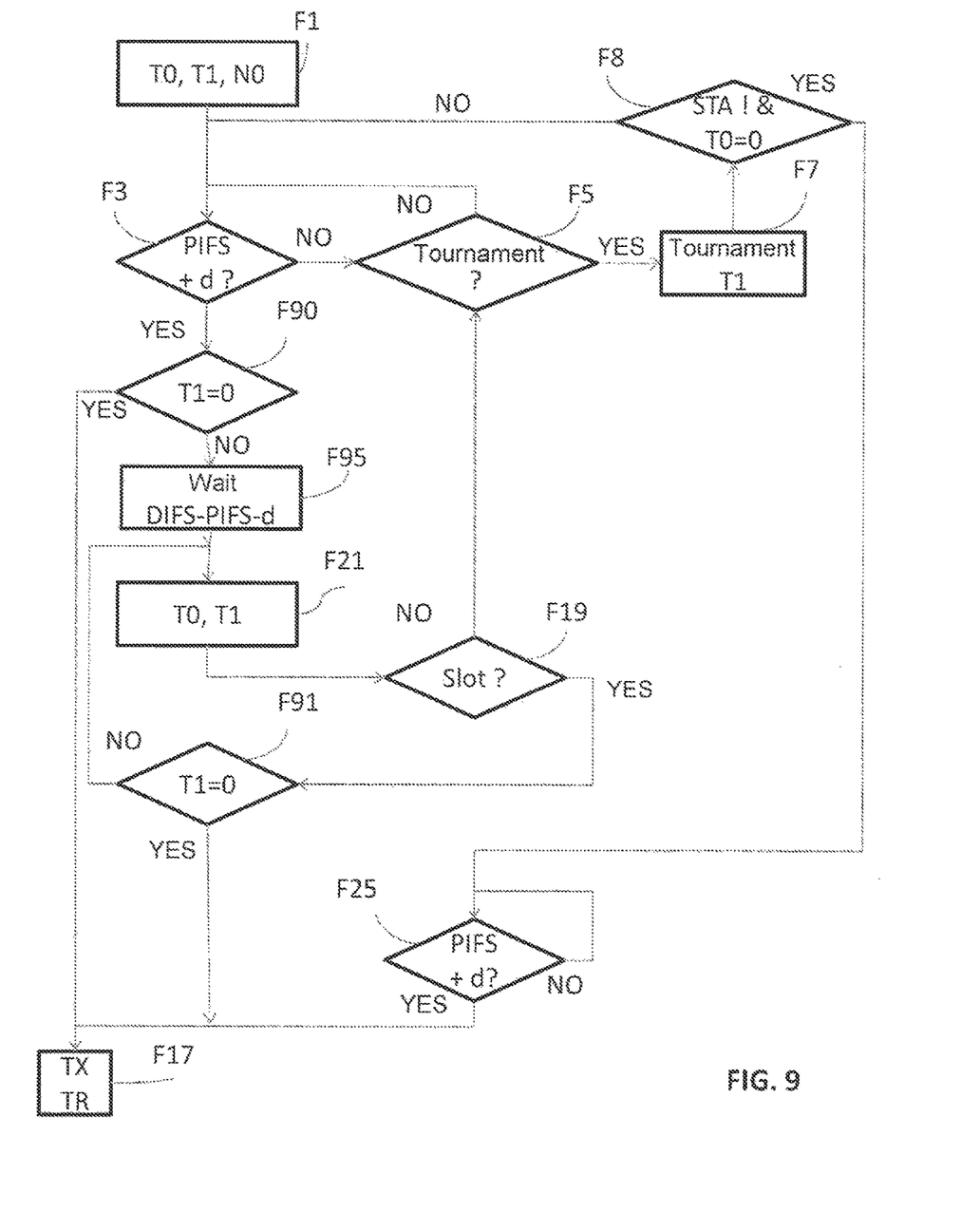

FIGS. 8 and 9 show two other contention procedure variants that can be used in the invention.

In general manner, these variants differ from the contention procedures described with reference to FIGS. 6 and 7 in that the wait at test F3 is of duration DIFS+d instead of DIFS in order to transmit in priority mode and avoid collisions with conventional stations.

In this implementation, it is necessary to reset timing to wait for the entire duration DIFS if the station is not transmitting (negative result from test F1). Consequently, in the presently-proposed implementation, the test F9 of FIGS. 6 and 7 is replaced by tests F90, F91 as shown in FIGS. 8 and 9.

Figure 10:
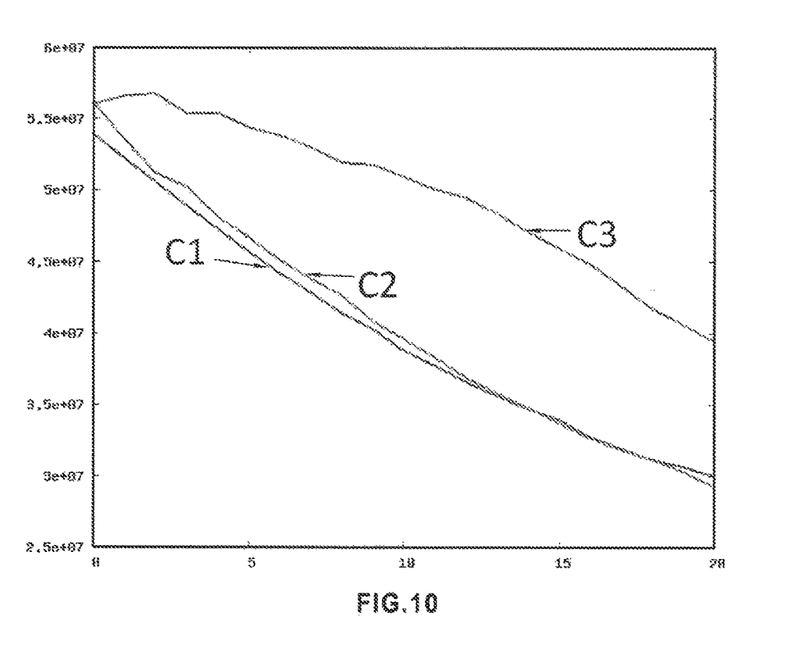
FIGS. 10 to 12 show the results of simulations serving to illustrate the advantages procured by the invention.
Figure 11:
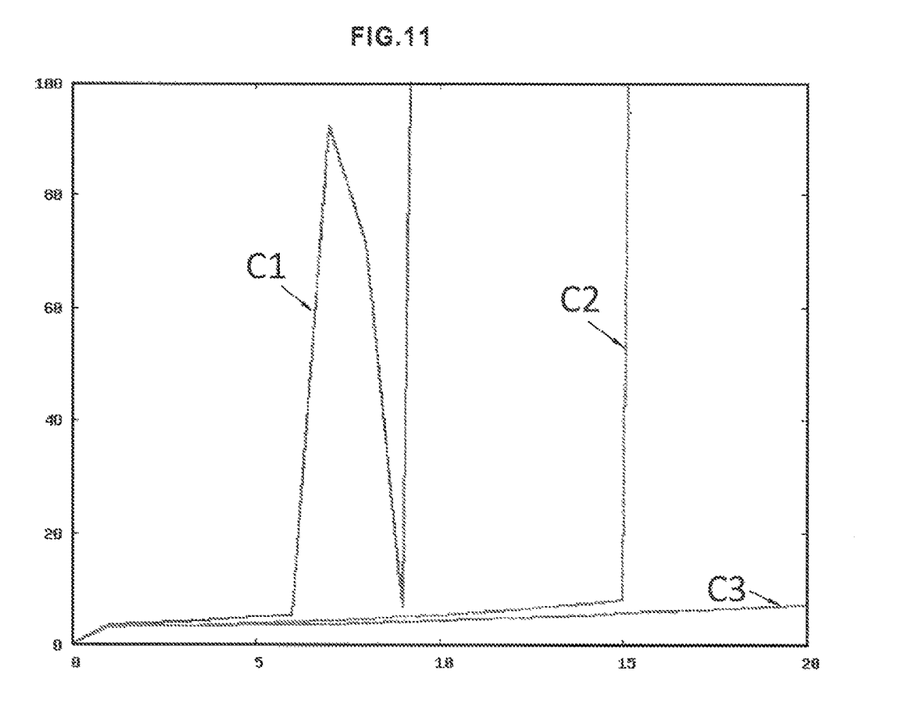
Figure 12:
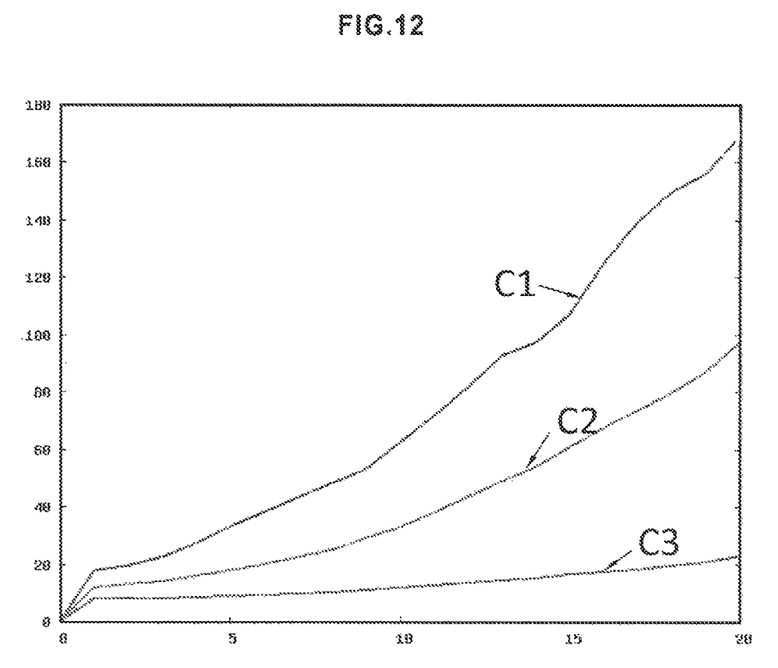

FIGS. 10 to 12 show the results of simulations serving to illustrate the advantages conferred by the invention.

In these figures, consideration is given to two stations continuously requesting bandwidth, e.g. as happens when downloading a large file.

Then, in addition to those two stations, consideration is given to a variable number of voice channels plotted along the abscissa axis in the figures.

In each of these figures:
the curve C1 corresponds to measurements for scenarios in which 100% of the stations are conventional;
the curve C2 corresponds to conventional station measurements for scenarios in which 50% of the stations are conventional, with 50% implementing the regulation method in accordance with the invention; and
the curve C3 corresponds to station measurements performing a regulation method in accordance with the invention for scenarios in which 50% of the stations are conventional and 50% are implementing a regulation method in accordance with the invention.

In FIG. 9, the data rate in bits per second as obtained by each of the downloading stations in these two scenarios is plotted up the ordinate axis. It can be seen in this figure that the conventional stations cohabiting with stations in accordance with the invention (curve C2) have as much and indeed more bandwidth than would stations cohabiting only with conventional stations (curve C1).

The ordinate axes in FIGS. 10 and 11 represent, for voice type stations, respectively the delay in milliseconds obtained for voice type packets and the variation in the delays of such packets (retaining 99% of the best packets, while ignoring the 1% of the worst).

It can be seen that stations in accordance with the invention reduce the number of collisions and improve the overall operation of the system.

It should also be observed that in FIG. 10, for more than six simultaneous voice calls, traditional WiFi loses so many packets that the overall delay shoots upwards (C2) whereas in the presence of the invention, this phenomenon occurs when there are more than 14 stations (curve C2).

The invention applies to all distributed mode radio networks. It may be applied to any carrier sense multiple access with collision avoidance (CMSA-CA) type system, and to power-line carrier (PLC) systems.

In the context of domestic or business use, the invention makes it possible to introduce new mechanisms for accessing the radio medium as are necessary for applications such as full duplex voice calls passing via a gateway acting as a business private automatic branch exchange (PABX).

The invention also makes it possible to obtain satisfactory cohabitation between video streams, monitoring streams, . . . , on a single WiFi channel, even when the channel is constrained to limited bandwidth (20 megahertz (MHz)).

The invention claimed is:

1. A transmission regulation method for implementation by a station having a frame for transmission via a network, said station belonging to a first group of stations sharing a first contention resolution mechanism, the method comprising:
participating in a tournament serving to decide, within said first group, between stations entitled to transmit at the end of said tournament and stations not entitled to transmit at the end of the tournament, and
upon a decision that said station is entitled to transmit:
simulating the behavior of at least one station of the second group having a frame for transmission, in order to estimate a number of free time slots to be waited that is equivalent to the number of free time slots that would have been waited by a station of the second group before transmitting a frame over the network;
waiting, prior to transmitting said frame, for the number of free time slots to be waited; and
transmitting said frame in a time period during which stations of a second group performing a second contention resolution mechanism are not entitled to transmit over said network, the first and second contention resolution mechanisms being different.

2. A transmission regulation method according to claim 1, wherein said time period is the period lying between the durations PCF Interframe Space (PIFS) and DCF Interframe Space (DIFS) as defined in the IEEE 802.11 standard and measured from the end of the transmission of a frame.

3. A transmission regulation method according to claim 1, comprising transmitting said frame after detecting a predetermined number of consecutive empty time slots.

4. A transmission regulation method according to claim 1, comprising transmitting said frame if no tournament has started during at least a predetermined duration.

5. A regulation device for incorporation in a station having a frame for transmission via a network, said station forming part of a first group of stations sharing a first contention resolution mechanism, said regulation device comprising:
a memory; and
a processor configured by said memory to:
participate in a tournament that is used to decide, within said first group , between stations entitled to transmit at the end of said tournament and stations not entitled to transmit at the end of the tournament; and
upon a decision that said station is entitled to transmit:
simulating the behavior of at least one station of the second group having a frame for transmission, in order to estimate a number of free time slots to be waited that is equivalent to the number of free time slots that would have been waited by a station of the second group before transmitting a frame over the network;
waiting, prior to transmitting said frame, for the number of free time slots to be waited; and
transmitting said frame in a time period during which the stations of a second group performing a second contention resolution mechanism are not entitled to transmit over said network, the first and second contention resolution mechanisms being different.

6. A computer comprising a memory, the memory having stored thereon instructions, which when executed by a processor, cause said computer to perform a transmission regulation method for implementation by a station having a frame for transmission via a network, said station belonging to a first group of stations sharing a first contention resolution mechanism, the method comprising:
participating in a tournament serving to decide, within said first group, between stations entitled to transmit at the end of said tournament and stations not entitled to transmit at the end of the tournament, and
upon a decision that said station is entitled to transmit:
simulating the behavior of at least one station of the second group having a frame for transmission, in order to estimate a number of free time slots to be waited that is equivalent to the number of free time slots that would have been waited by a station of the second group before transmitting a frame over the network;
waiting, prior to transmitting said frame, for the number of free time slots to be waited; and transmitting said frame in a time period during which stations of a second group performing a second contention resolution mechanism are not entitled to transmit over said network, the first and second contention resolution mechanisms being different.

7. A non-transitory computer readable medium having stored thereon instructions, which when executed by a processor, perform a transmission regulation method for implementation by a station having a frame for transmission via a network, said station belonging to a first group of stations sharing a first contention resolution mechanism, the method comprising:

participating in a tournament serving to decide, within said first group, between stations entitled to transmit at the end of said tournament and stations not entitled to transmit at the end of the tournament, and upon a decision that said station is entitled to transmit:
simulating the behavior of at least one station of the second group having a frame for transmission, in order to estimate a number of free time slots to be waited that is equivalent to the number of free time slots that would have been waited by a station of the second group before transmitting a frame over the network;
waiting prior to transmitting said from for the number of free time slots to be waited; and
transmitting said frame in a time period during which stations of a second group performing a second contention resolution mechanism are not entitled to transmit over said network, the first and second contention resolution mechanisms being different.

8. The regulation device of claim 5, wherein said time period is the period lying between the durations PCF Interframe Space (PIFS) and DCF Interframe Space (DIFS) as defined in the IEEE 802.11 standard and measured from the end of the transmission of a frame.

9. The regulation device of claim 5, wherein the processor is configured to transmit said frame after detecting a predetermined number of consecutive empty time slots.

10. The regulation device of claim 5, wherein the processor is configured to transmit said frame if no tournament has started during at least a predetermined duration.

11. The computer of claim 6, wherein said time period is the period lying between the durations PCF Interframe Space (PIFS) and DCF Interframe Space (DIFS) as defined in the IEEE 802.11 standard and measured from the end of the transmission of a frame.

12. The non-transitory computer readable medium of claim 7, wherein said time period is the period lying between the durations PCF Interframe Space (PIFS) and DCF Interframe Space (DIFS) as defined in the IEEE 802.11 standard and measured from the end of the transmission of a frame.

13. The non-transitory computer readable medium of claim 7, wherein the method comprises transmitting said frame after detecting a predetermined number of consecutive empty time slots.

14. The non-transitory computer readable medium of claim 7, wherein the method comprises transmitting said frame if no tournament has started during at least a predetermined duration.

* * * * *